United States Patent
Grail et al.

(10) Patent No.: US 12,544,989 B2
(45) Date of Patent: Feb. 10, 2026

(54) METHOD FOR PRODUCING A PART FROM A WOVEN MATERIAL TAKING THE OFF-CENTERING INTO ACCOUNT

(71) Applicant: SAFRAN AIRCRAFT ENGINES, Paris (FR)

(72) Inventors: Gaël Robert Grail, Moissy-Cramayel (FR); Sylvain Mousillat, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 777 days.

(21) Appl. No.: 17/433,490

(22) PCT Filed: Feb. 28, 2020

(86) PCT No.: PCT/FR2020/050399
§ 371 (c)(1),
(2) Date: Aug. 24, 2021

(87) PCT Pub. No.: WO2020/174198
PCT Pub. Date: Sep. 3, 2020

(65) Prior Publication Data
US 2022/0134683 A1    May 5, 2022

(30) Foreign Application Priority Data
Feb. 28, 2019    (FR) ...................... 1902083

(51) Int. Cl.
*B29C 70/22*    (2006.01)
*G06F 30/10*    (2020.01)

(52) U.S. Cl.
CPC ............ *B29C 70/222* (2013.01); *G06F 30/10* (2020.01)

(58) Field of Classification Search
CPC ...... B29C 70/222; B29C 70/22; B29C 70/228
See application file for complete search history.

(56) References Cited

U.S. PATENT DOCUMENTS

| | | | |
|---|---|---|---|
| 7,797,075 B1* | 9/2010 | Zhang .................. | B29C 70/443 700/200 |
| 2002/0155186 A1* | 10/2002 | Walsh .................. | B29C 70/548 425/169 |

(Continued)

OTHER PUBLICATIONS

Lee, S.H., et al., Three-Dimensional Flow Simulation of Resin Transfer Molding Utilizing Multilayered Fiber Preform, Journal of Applied Polymer Science, vol. 114 (2009), pp. 1803-1812. (Year: 2009).*

(Continued)

*Primary Examiner* — Matthew J Daniels
(74) *Attorney, Agent, or Firm* — CHRISTENSEN O'CONNOR JOHNSON KINDNESS PLLC (57) ABSTRACT

Methods are provided for creating a component from a preform having a network of fibers having, after the shaping of the preform, an out-of-register angle. The methods include: defining an orthogonal local frame of reference, defining a natural local frame of reference, defining a linked frame of reference, expressing a tensor of the stiffnesses of the woven composite material in said natural local frame of reference, constructing a tensor of the deformations in the orthogonal local frame of reference, expressing, in the linked frame of reference, the tensor of the deformations, calculating a tensor of the stresses in the natural local frame of reference, expressing, in the orthogonal local frame of reference, the stresses tensor, expressing the stiffnesses tensor, constructing a tangent operator, establishing an optimized configuration for the network, and locally adapting the network before impregnating said network.

9 Claims, 3 Drawing Sheets

(56) References Cited

U.S. PATENT DOCUMENTS

| | | | |
|---|---|---|---|
| 2004/0083065 A1* | 4/2004 | Daniel | B29C 70/54 |
| | | | 702/35 |
| 2005/0084377 A1* | 4/2005 | Dambrine | F04D 29/023 |
| | | | 416/223 R |
| 2013/0269159 A1* | 10/2013 | Robitaille | D04B 21/16 |
| | | | 28/143 |
| 2014/0316547 A1 | 10/2014 | Marchal et al. | |
| 2015/0167209 A1* | 6/2015 | Marchal | B29D 99/0028 |
| | | | 428/116 |
| 2017/0017740 A1* | 1/2017 | Arnold | G06F 30/23 |

OTHER PUBLICATIONS

Yu, W.R., et al., Analysis of flexible bending behavior of woven preform using non-orthogonal constitutive equation, Composites: Part A, vol. 36 (2005), pp. 839-850. (Year: 2005).*

Harrison, P., Modelling the forming mechanics of engineering fabrics using a mutually constrained pantographic beam and membrane mesh, Composites: Part A, vol. 81 (2016), pp. 145-157. (Year: 2016).*

English Translation of the International Search Report mailed on Aug. 10, 2020, issued in corresponding International Patent Application No. PCT/FR2020/050399, filed on Feb. 28, 2020, 3 pages.

Boisse, P., et al. "Analyses of fabric tensile behaviour: determination of the biaxial tension-strain surfaces and their use in forming simulations," Composites Part A: Applied Science and Manufacturing: Elsevier, Amsterdam, NL; 32 (10):1395-1414, Oct. 2001.

Ten Thije, R. H. W. and A. J. Huetink, "Large deformation simulation of anisotropic material using an updated Lagrangian finite element method," Computer Methods in Applied Mechanics and Engineering: Elsevier, Amsterdam, NL; 196(33-34): 3141-3150, Jul. 1, 2007.

Vanclooster, K., et al. "Experimental validation of forming simulations of fabric reinforced polymers using an unsymmetrical mould configuration," Composites Part A: Applied Science and Manufacturing: Elsevier, Amsterdam, NL; 40(4): 530-539, Apr. 2009.

English Translation of the Written Opinion of the International Searching Authority mailed on Aug. 10, 2020, issued in corresponding International Application No. PCT/FR2020/050399, filed on Feb. 28, 2020, 6 pages.

* cited by examiner

METHOD FOR PRODUCING A PART FROM A WOVEN MATERIAL TAKING THE OFF-CENTERING INTO ACCOUNT

CROSS-REFERENCES TO RELATED APPLICATIONS

This application is a National Stage of International Application No. PCT/FR2020/050399, filed Feb. 28, 2020, which claims priority to French Patent Application No. 1902083, filed Feb. 28, 2019, the entire disclosures of which are hereby incorporated by reference.

TECHNICAL FIELD OF THE INVENTION

The present invention relates to the field of producing parts made of woven composite material, after shaping one or more 2D or 3D fabric folds.

BACKGROUND

In a conventional manner and well known per se, a part made of woven composite material comprises a woven preform, serving as reinforcement, and a polymer matrix, serving as binder. Classically, the fibres of the woven preform are made of carbon, glass, Kevlar or linen fibres.

The woven preform, when the positioning of the fibres within the preform is not random but has two preferred directions, comprises two types of yarns forming a network: the warps (which extend along the weaving direction) and the wefts (which extend transversely to the weaving direction). The warps are often substantially parallel to each other and the wefts are often substantially parallel to each other. Warps and wefts usually cross each other at approximately right angles. The warps-wefts frame of reference is generally considered to be orthogonal. It is then convenient and common to consider that the equivalent homogeneous composite material is orthotropic. This is the case, for example, for preforms coming out of the looms.

However, when a woven preform is shaped, for example to form a casing or a vane, the warps and the wefts slip and rotate relative to each other and there is, locally, a loss of orthogonality of the warp-weft frame of reference. This loss of orthogonality is called off-centering. The material can no longer be considered orthotropic; it becomes anisotropic. The angle $\alpha$ measuring the difference between the off-centered position of a weft yarn and its original position is called the "off-centering angle".

Depending on the parts (or part areas) considered, some off-centering angles can reach up to 45°, with values more commonly between 0° and 25°.

For each material used in the manufacture of an engine part, a so-called behavior law is classically established. A behavior law of a material aims at modelling the behavior (states of deformation and stress) of said material according to different conditions applied to said material (traction, pressures, etc. . . . ) and is identified in an empirical way by subjecting said material to traction experiments, for example. The same material can follow several behavior laws. However, the number of behavior laws remaining valid when the orthogonality of the material is lost, is decreasing. This number even tends to cancel out when the laws in question are non-linear. In addition, the value of the off-centering angles is often inhomogeneous in the part. If there is an anisotropic behavior law, then the material parameters will have to be identified for each off-centering angle since they will depend intrinsically on this value, which in practice is not feasible.

The mechanical properties of the woven material under consideration change considerably with a large off-centering angle. In traction and compression, a material called off-centered is suppler in the direction of the wefts and stiffer in the directions of the warps. In the absence of a law allowing to model the behavior of a material whose fibres have lost their orthogonality, it would be necessary to mechanically test each part produced. As this is not possible, a margin is provided for in the manufacture of the parts, i.e. certain areas of certain parts, such as for example the casing flanges, are deliberately oversized. Typically, the casing is sized to accommodate up to 60% loss of properties in the weft direction for an off-centering angle of 30 degree of loss of properties, so said flange is designed to be about twice as thick as it would be without the off-centering. This leads to a high rate of material wastage and a significant addition of mass to the engine.

Currently, it is possible to predict the off-centering angles but it is not possible to take them into account during the manufacture of the parts. Indeed, the amount of behavior laws still valid when the orthogonality of the fibres of the woven material is lost, decreases and tends to cancel when the laws in question are non-linear. In addition, the value of the off-centering angles is often inhomogeneous in the part. If there is an anisotropic behavior law, then the parameters of the material will have to be identified for each off-centering angle since they will depend intrinsically on this value, which in practice is not feasible.

The objective of the present applicant is therefore to provide in particular a method for producing part made of woven composite material which allows to anticipate and take into account the off-centering of the warp-weft frame of reference during the shaping of the woven reinforcement of the part.

SUMMARY OF THE INVENTION

This objective is achieved in accordance with the invention by means of a method for producing a part made of composite material from a woven preform intended to be shaped, the preform comprising woven warp fibres and weft fibres forming a network, said preform being intended to be impregnated with a polymer matrix so as to form a woven composite material, the network of fibres having, before the shaping of the preform, two preferred directions that are substantially perpendicular to each other, and having, after the shaping of the preform, at least one off-centering angle $\alpha$, the woven composite material furthermore following, without any particular shaping of the preform, a known general behavior law, the method being characterized in that it comprises the following steps:

defining an orthogonal local frame of reference with respect to the network before the shaping of the preform, defining a natural local frame of reference with respect to the network after the shaping of the preform, defining a linked frame of reference with respect to the network, expressing a tensor of the stiff nesses of the woven composite material in said natural local frame of reference, the tensor of the stiffnesses being known in the orthogonal local frame of reference and unchanged regardless of the off-centering angle, constructing a tensor of the deformations in the orthogonal local frame of reference, expressing, in the linked frame of reference, the tensor of the deformations previously constructed beforehand in the orthogonal local frame of reference, calculating a tensor of the stresses in the natural local frame of reference from the behavior law that is dependent on the tensor of the stiffnesses expressed in the natural local frame of reference $R_2$ and on the deformation tensor expressed in the linked frame of reference, expressing, in the orthogonal local frame of reference, the stresses tensor calculated beforehand using the behavior law, expressing the tensor of the stiffnesses C, already expressed in the natural local frame of reference, in the orthogonal local frame of reference, constructing a tangent operator for a numerical solution using the finite-element method comprising components which are equal to those of the tensor of the stiffnesses previously expressed in the orthogonal local frame of reference, establishing an optimized configuration for the network of fibres before the shaping of the preform on the basis of at least the stress tensor expressed in the orthogonal local frame of reference, and locally adapting the fibres of the network during a weaving prior to the impregnation of said network of fibres with the matrix, so as to fix said fibres in the optimized configuration, placing the preform in a mold, impregnating the preform with the polymer matrix, demolding the part.

The proposed technical solution allows to take into account the different off-centering angles from geometric considerations and to optimize the manufacture of the part by including (and more precisely by taking into account) these different post shaping off-centering angles in the design and the production of said part. This solution applies to all behavior laws (linear as well as non-linear) without the need for reformulation. In addition, the identification of material parameters remains unchanged. Only the knowledge of the off-centering angle is required for its implementation. It is therefore easy to vary the "behavior law" object continuously with the field of the off-centering angles and thus to anticipate the mechanical behavior of the woven material as a function of the off-centering angle. This allows to adapt the off-centering angle during the production of the part, depending on the expected local mechanical properties. Also by taking into account the off-centering angles to predict the mechanical behavior of the part made of woven composite material, the manufacturing time and costs are reduced. In fact, generally speaking, to produce a final part in woven composite material that meets the specifications in terms of mechanical behavior and service life, a period of at least one elapses through modelling, prototypes, tests on these prototypes and redesigns taking into account the results of the tests. The realization of these tests on each part is very expensive. With this manufacturing process, the manufacturing time (with all the steps of modeling, designing, testing, etc.) can be shortened by at least 30% which positively impacts the cost, and the design of the final part made of composite material is in line with the expectations. The parts obtained are more efficient because it is no longer necessary to apply a random safety coefficient, which implies significant additional material on the dimensions, mass and cost of the part. Finally, the service life of the parts is better calculated and optimized.

The method according to the invention may comprise one or more of the following characteristics, taken alone or in combination with each other:

the natural local frame of reference is defined as the frame of reference attached to the preferred directions of the fibres of the off-centered network, the natural local frame of reference being non-orthogonal in the presence of a non-zero off-centering angle $\alpha$, the natural local frame of reference is defined as a covariant local frame of reference and that the linked frame of reference is defined as the contravariant local frame of reference, dual of the natural local frame of reference, the passage from the orthogonal local frame of reference to the natural local frame of reference is made by means of a passage matrix defined as:

$$J^T = \begin{pmatrix} 1 & \sin\alpha & 0 \\ 0 & \cos\alpha & 0 \\ 0 & 0 & 1 \end{pmatrix}$$

the general behavior law is a linear elastic behavior law and the tangent operator is a tensor of the elastic stiffnesses, the part is a vane, the part is a casing.

The invention also relates to a fold of a dry (3D) woven preform, comprising a network of fibres, said network having locally at least one area in which it is not orthogonal, this area having been defined by the method described above.

The fold may constitute a preform as aforesaid or a plurality of folds associated for example by contact may constitute such a preform.

Finally, the invention relates to a turbomachine part made of woven composite material produced by shaping a woven preform comprising a network of fibres impregnated with a polymer matrix, said network having, prior to the shaping of the preform, at least one area in which it is not orthonormal, this area having been defined by the method described above.

BRIEF DESCRIPTION OF FIGURES

Further characteristics and advantages of the invention will become apparent from the following detailed description, for the understanding of which reference is made to the attached drawings in which.

DETAILED DESCRIPTION OF THE INVENTION

The method proposed in the present invention consists in, firstly, modelling the part 10 to be manufactured, for example a fan vane of a turbomachine. The modelling is carried out using, for example, a calculation software by the method of the computer-aided finite-elements and equipping said computer.

Figure 1:
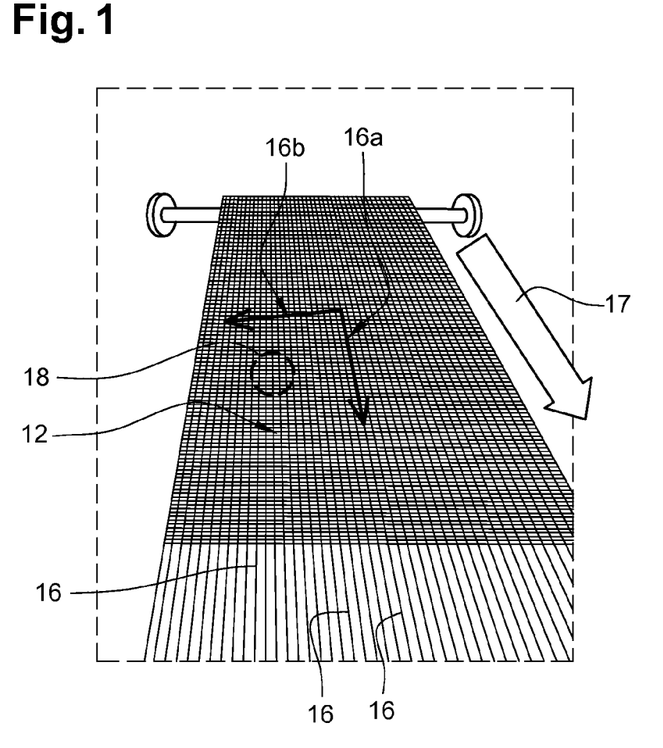
FIG. 1 is a front view of a conventional loom allowing to weave a woven preform.

This part 10 is manufactured from the shaping of a woven preform 12. This woven preform 12 comprises woven fibres and is conventionally, as illustrated in FIG. 1, woven on a loom allowing to obtain either a preform from a single lap or fold, or from a plurality of laps or folds that are arranged together to constitute a conformed preform. The fold or the folds that form the preform are said to be dry. Indeed, the fold or the folds are not yet impregnated with a matrix intended to densify the woven preform.

Figure 2:
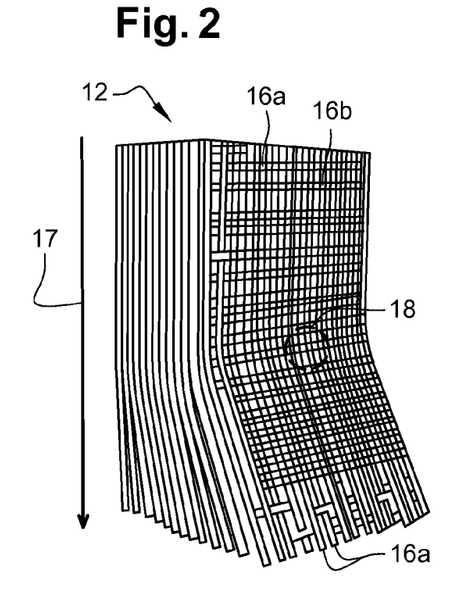
FIG. 2 is a schematic cross-sectional view of a woven preform prior to shaping said preform.

At the loom outlet, the preform 12 thus has a set of fibres woven along two preferred directions that are substantially perpendicular to each other, as visible in FIG. 1. A distinction is made between two types of fibres or yarns: the warp fibres 16a which extend in the direction of the weaving 17 and the weft fibres 16b which extend substantially perpendicular to the weaving direction 17, and thus to the warps 16a. This set of warps 16a and wefts 16b thus forms a substantially orthogonal network 18, as seen in FIG. 2.

Figure 3:
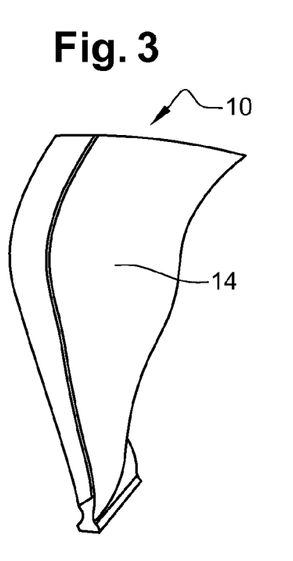
FIG. 3 is a turbomachine vane produced by means of a shaping and an impregnation of a matrix of a preform as shown in the preceding figures.
Figure 4A:
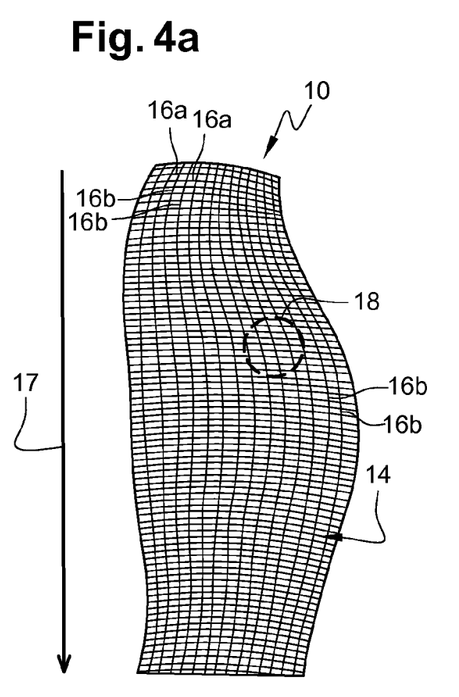
FIG. 4a is a schematic view of the deformations of the network of the preform once it has been shaped.
Figure 4B:
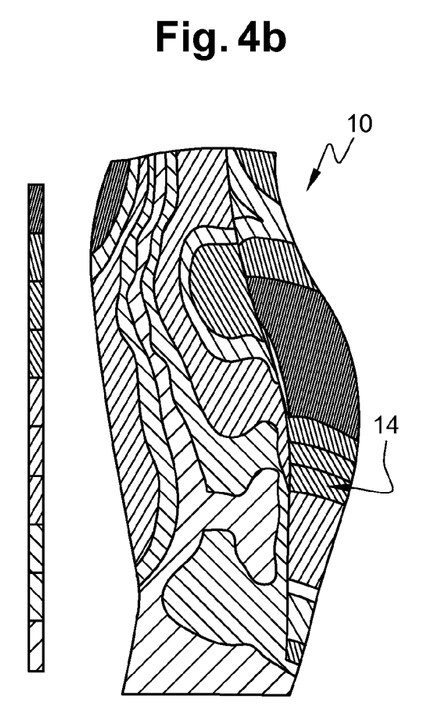
FIG. 4b is a similar view to that of FIG. 4a, but the changes in the off-centering angle $\alpha$ are shown numerically.
Figure 5:
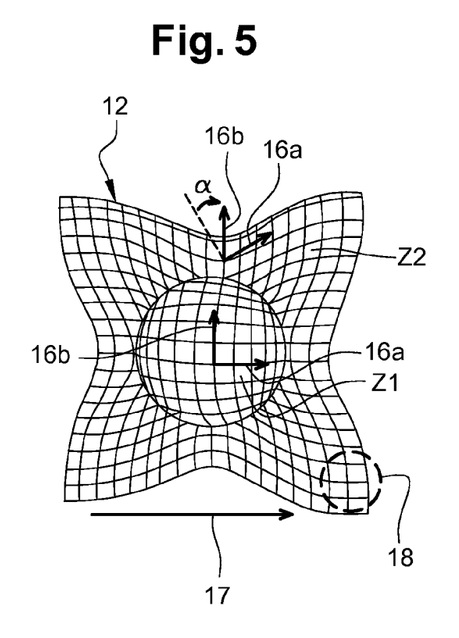
FIG. 5 is a schematic view of the change in the off-centering angle $\alpha$ before and after shaping the preform.

The woven preform 12 is then shaped, (as seen in FIG. 3) to give, after matrix impregnation and curing, the part 10. The shaping is typically carried out in an injection mold in which the matrix is injected. However, as illustrated in FIGS. 4a and 4b, it can be seen that this shaping of the preform 12 induces a series of deformations of the network 18. The network 18 is no longer orthogonal: it is off-centered. That is, a off-centering angle α has occurred between the initial direction (pre-shaping) and final direction (post-shaping) of the weft fibres 16b (see FIG. 5). After the shaping, the weft fibres 16b of the network 18 are no longer perpendicular to the weaving direction 17. It can be seen in FIG. 4b, that the off-centering angle α varies locally along the surface of the part 10. FIG. 5 shows the evolution of the network 18 before shaping of the preform 12 (zone $Z_1$—orthonormal) and after shaping of the preform 12 (zone $Z_2$—off-centered).

Once shaped, the preform 12 is typically impregnated with a polymer matrix and then cured in an autoclave to form the woven composite material part 10. A composite material is defined as a woven preform 12 impregnated with a polymer matrix. This woven composite material 14 has known mechanical properties. These mechanical properties are expressed by a known general behavior law L. For example, it can be a linear elastic behavior law. It is important to note that the behavior law mentioned here characterizes the behavior of the woven composite material 14 (preform and matrix), not the preform itself. The mechanical behavior of a woven composite material 14 is influenced by the off-centering angles α. Similarly, the mechanical behavior of a woven composite material is different from that of a preform (dry fibrous reinforcement).

These off-centering angles α induce a variation in the mechanical properties of the woven composite material 14 as a function of the different areas $Z_1$, $Z_2$ of the part 10. These variations in mechanical properties induce weaknesses and require the design of parts 10 with some oversized parts so as to compensate for the mechanical weaknesses of the off-centered woven composite material 14. An "off-centered woven composite material 14" is referred as a woven composite material whose woven preform 12 have a fibres network 18 with a non-zero off-centering angle α. In other words, a woven composite material 14 with a woven preform 12 having an off-centered network 18 is referred to as a "off-centered woven composite material 14".

As with any network, the orientations of the fibres 16a, 16b of the network 18 can be expressed by decomposition on the vectors of a base. In mathematics, a base of a vector space V is a free family of vectors of V which generates V. We can therefore express the directions of the fibres 16a, 16b of the initial (pre-shaping) network 18 in a base $B_1$ of an orthogonal local frame of reference $R_1$. This allows to define, among other things, a general behavior law L. This general behavior law L can be classically composed of tensors having numerical values of the coordinates in the considered base $B_1$.

In order to remedy these problems of oversizing, the present invention involves modeling the behavior of the woven composite material 14 off-centered in a base $B_2$ of a local frame of reference $R_2$ called natural (or off-centered). This natural local frame of reference $R_2$ is related to the directions of the fibres 16, 16b of the network 18 after off-centering. This modelling is done in the same way as the modelling of the behavior of the orthotropic woven composite material 14 (with zero off-centering angle α) in the base $B_1$ of the orthogonal local frame of reference $R_1$. Indeed, we consider that the network 18 keeps its material symmetries in the natural local frame of reference $R_2$: we consider that the off-centered network 18 behaves like an orthotropic material in the natural local frame of reference $R_2$. This natural local frame of reference $R_2$ thus allows the behavior of an off-centered composite material 14 to be modeled by a set of reliable, so-called definitive, behavior laws, regardless of the different local off-centering angles α. This modeling implies that:

the components of the various tensors (projected in the natural frame of reference $R_2$ and) involved in said general behavior law L are identical for the orthotropic and off-centered woven composite materials 14 (i.e. before and after shaping of the preform 12), only the bases $B_1$, $B_2$ of the frames of reference $R_1$, $R_2$ on which these tensors are projected are different, as with the fibres 16a, 16b of the original network 18, the off-centered base $B_2$ is no longer orthogonal in the presence of off-centering.

The shaping of the woven preform 12 of the part 10 to be produced is modelled in such a way as to predict locally the deformations and the off-centering angles α of the network 18 of fibres 16a, 16b as a function of the shaping of the preform 12. In the context of the present invention, this modelling is geometric and is obtained by a numerical simulation of the shaping of the preform following an algorithm of the improved net. Then, the off-centering angles allow the modeling of the part 10 by the finite-element method.

In a first step, the orthogonal local frame of reference $R_1$ is defined with respect to the network 18 before shaping the preform 12.

In a second step of the method, the natural local frame of reference $R_2$ is defined. This definition of the frame of reference $R_2$ allows to express a tensor of the stiffnesses C of the off-centered woven composite material 14. In the case of a non-off-centered woven composite material 14, this tensor of the stiffnesses C is conventionally defined in the orthogonal local frame of reference $R_1$. The components of the tensor of the stiffnesses C are known in the orthogonal local frame of reference $R_1$. Any tensor of the stiffnesses is obtained experimentally by experimental testing on a woven composite material (in the form of a specimen) and in the orthogonal local frame of reference $R_1$ (without off-centering). Each tensor of the stiffnesses is related to a defined material. In the case of an off-centered woven composite material, the components of the tensor C are assumed to be known and unchanged (or invariant) in the natural frame of reference $R_2$ regardless of the value of the off-centering angle $\alpha$. This point (expression of the tensor of the stiffnesses C of the woven composite material 14 in said natural local frame of reference $R_2$) is the core and the novelty of the proposed technical solution.

Figure 7:
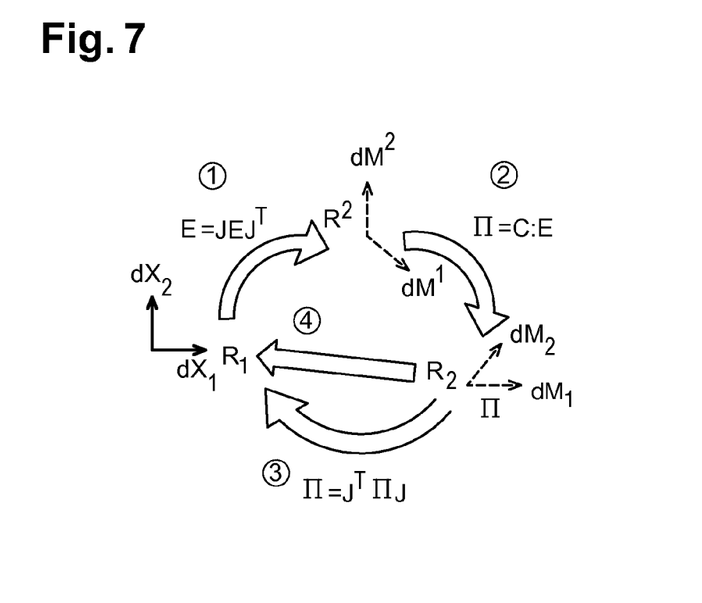
FIG. 7 is a schematic summary of the first four steps of the method according to the invention.

During a third step, a tensor of the deformations E in the orthogonal local frame of reference $R_1$ is first defined or constructed. The tensor of the deformations is provided by a person skilled in the art and/or preferably by a software used to perform the modeling by the method of the finite-elements. The tensor of the deformations is known in the mathematical sense. In a second time, the tensor of the deformations E is expressed in a linked frame of reference $R^2$. The linked frame of reference $R^2$ is defined with respect to the fibre network. The expression or the calculation is performed by means of a $J^T$ passage matrix as shown in FIG. 7. Here, this linked frame of reference $R^2$ is the contravariant local frame of reference $R^2$, dual of the natural local frame of reference $R^2$, called covariant frame of reference. Finally, the behavior law of the woven composite material is used to, by means of the tensors C and E, calculate a tensor of the stresses $\pi$ in the natural local frame of reference $R_2$.

During a fourth step, the tensor of the stresses $\pi$ obtained above is expressed in the orthogonal local frame of reference $R_1$ by means of a passage matrix $J^T$.

During a fifth step, a tangent operator (necessary element) is constructed for a numerical solution by the method of the finite-elements comprising components which are equal to those of the tensor of the stiffnesses previously expressed in the orthogonal local frame of reference $R_1$ In particular, and in other words, the components of the tensor of the stiffnesses C in the orthogonal local frame of reference $R_1$ are calculated numerically. In the case of a linear finite-element calculation, the tangent operator is equal to C expressed in $R_1$. In the case of a nonlinear finite-element calculation, the expression of the tangent operator is more complex and depends on the nature of the nonlinearity.

In order to allow a simplified understanding of the first five steps of the method of the present invention, the case of the dimension 2 is developed in the following. However, the technical solution proposed by the present invention remains entirely applicable in dimension 3.

Figure 6:
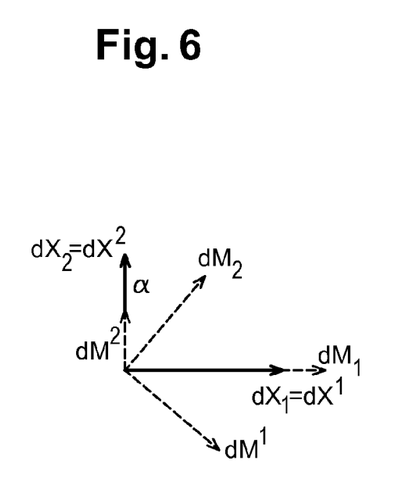
FIG. 6 is an illustration of a set of frames of reference based on the local orthonormal frame of reference according to the invention.

More precisely, we consider the orthogonal local frame of reference $R_1$ represented on FIG. 6 by the two vectors $dX_1$ and $dX_2$. The orthogonal local frame of reference $R_1$ is written mathematically as $R_1=dX_1-dX_2$. It corresponds to the frame of reference in which the deformations (tensor E) and the stresses (tensor $\pi$) must be expressed when using the method of the finite-elements. These deformations E and these stresses $\pi$ are provided respectively as input and output of the general behavior law L.

We then consider the natural local frame of reference $R_2$. The natural local frame of reference $R_2$ is written mathematically $R_2=dM_1-dM_2$. It is represented in FIG. 6 by the two vectors $dM_1$ and $dM_2$. The natural local frame of reference $R_2$ is the frame of reference attached to the preferred directions of the fibres 16a, 16b of the off-centered network 18. The natural local frame of reference $R_2$ is non-orthogonal in the presence of a non-zero off-centering angle $\alpha$, i.e. when a is different from 0.

In mathematics, a collection of reference elements, one of which is designated as the origin, is called a "frame of reference", these elements allowing any object in a given set to be designated in a simple manner. In geometry, a frame of reference is used to define the coordinates of each point. The frames of reference are used, for example, to represent data graphically.

The off-centering angle $\alpha$ is thus defined as the angle formed between $dM_2$ and $dX_2$ (see FIG. 6).

With the definition of the off-centering angle $\alpha$ shown in FIG. 6, the passage matrix $J^T$ from the orthogonal local frame of reference $R_1$ to the natural local frame of reference $R_2$ has the expression:

$$J^T = \begin{pmatrix} 1 & \sin\alpha & 0 \\ 0 & \cos\alpha & 0 \\ 0 & 0 & 1 \end{pmatrix}$$

Recall that the result of the product of two tensors should not depend on the frames of reference in which they are expressed. This is the principle of objectivity of the physical laws. For this, it is therefore necessary that the two tensors E and C are expressed in dual bases.

More generally, in mathematics, the space of the linear forms on V is called the "dual space of a vector space V". A particular type of linear application is called "linear forms". A linear application (also called linear operator or linear transformation but many authors reserve the word "transformation" for those that are bijective) is an application between two vector spaces over a body K or two modules over a ring that respects the addition of the vectors and the scalar multiplication defined in these vector spaces or modules, or, in other words, that "preserves the linear combinations".

In order to express two tensors E and C in dual bases (one with respect to the other) (in particular C is in a base and E is expressed in a base dual to that of C), the mathematical formalism followed in the proposed technical solution is that of the linear algebra. The linear algebra also allows to access to the notions of covariant base and contravariant base. These notions of covariant base and contravariant base are applied to the case of off-centered woven composite material 14 discussed in the present invention: thus, the natural local frame of reference $R_2$ associated with the base $B_2$ (represented by the vectors $dM_1$ and $dM_2$ in FIG. 6) is defined as covariant. This frame of reference changes with $\alpha$, and is merged with the orthogonal frame of reference $R_1$ (represented by the vectors $dX_1$ and $dX_2$ in FIG. 6) when the off-centering angle $\alpha$ is zero. We also define a dual frame of reference $R^2$. This frame of reference is defined as the dual frame of reference of the natural local frame of reference $R_2$. This dual frame of reference $R^2$ is associated with a so-called contravariant base $B^2$ (represented by the vectors $dM_1$ and $dM_2$ in FIG. 6). This dual frame of reference $R^2$ also changes with the off-centering angle $\alpha$, and is also merged with the orthogonal local frame of reference $R_1$ when the off-centering angle $\alpha$ is zero. So mathematically we define the dual frame of reference $R^2$ as $R^2=dM^1-dM^2$. Each of its vectors $dM^i$ of the dual frame of reference $R^2$ is orthogonal to the vector $dM^1$ of the corresponding natural local frame of reference $R_2$, with i≠j=1,2. Note that a frame of reference is identical to its dual if it is orthogonal. Note also that when a basis is orthogonal, it is confused with its dual base and the covariant $B_2$ and contravariant $B^2$ bases are identical.

In order to better explain the present invention, a concrete example of the first five steps of the method of the present invention, based on the notions defined above, is proposed in the following. The example is based on a particular general behavior law L: a linear elastic behavior law. In the absence of off-centering, recall that this law allows us to calculate the tensor of the stresses $\pi$ by double contracted product of the tensor of the stiffnesses C and the tensor of the deformations E. We thus express $\pi$=C:E. The five steps detailed below are illustrated in FIG. 7.

Step 1: the shaping of the woven reinforcement of the part 10 to be produced is modelled so as to predict locally the deformations and the off-centering angles $\alpha$ of the network 18 of fibres 16a, 16b according to the shaping of the preform 12.
(in summary, this is how we obtain the off-centering angles $\alpha$)

Step 2: The components of the tensor of the stiffnesses of the material C are assumed to be known and unchanged in the natural local frame of reference $R_2$ regardless of the value of the off-centering angle $\alpha$. The tensor C is thus expressed in the natural local frame of reference $R_2$.
(in summary, the frames of reference $R_2$ and $R^2$ are constructed as a function of the previously obtained off-centering angles $\alpha$ and C is expressed)

Step 3: the tensor of the deformations E is provided (by a person skilled in the art) as an input to the behavior law L in the orthogonal local frame of reference $R_1$. The tensor E is then expressed in the dual frame of reference $R^2$ with $E=JEJ^T$ (with $J^T$, the matrix of passage from the orthogonal local frame of reference $R_1$ to the natural local frame of reference $R_2$). The tensor E being expressed in the dual frame of reference $R^2$ and the tensor C being expressed in the natural local frame of reference $R_2$, the tensors C and E are thus expressed in dual frames of reference ($R_2$ and $R^2$): their tensor product is thus objective, in the sense of the principle of objectivity of the physical laws. Thus, we can calculate the components of the tensor of the stresses $\pi$ ($\pi$=C:E) in the covariant base $B_2$ of the natural local frame of reference $R_2$.
(in summary, we express the tensor E in the frame of reference $R^2$ (referred to as contravariant), then the behavior law is used to obtain $\pi$ in $R_2$ (referred to as covariant))

Step 4: the tensor of the stresses $\pi$, which has been calculated beforehand, is expressed in the orthogonal local frame of reference $R_1$ (expression expected by the person skilled in the art) with $\pi=J\pi J^T$ (with $J^T$, the passage matrix from the orthogonal local frame of reference $R_1$ to the natural local frame of reference $R_2$).

Step 5: Numerical solution by means of a tangent operator. The components of the tangent operator are calculated by means of the general behavior law L. In the present case, these components are calculated in the orthogonal local frame of reference $R_1$. In the case of a general linear elastic behavior law L, the tangent operator is equal to the tensor of the elastic stiffnesses and its components in the frame of reference $R_1$ are calculated by a change of base operation applied to a fourth order tensor whose expression is the following:

$$\bar{\bar{C}}[v(p,q),v(r,s)]=J^T[p,i] \cdot J^T[q,j] \cdot J^T[r,k] \cdot J^T[s,l] \cdot \bar{\bar{C}}[v(i,j), v(k,l)],$$

with: p, q, r, s, i, j, k, l being integer indices each in [1,2,3], $J^T$ being the matrix of passage from $R_1$ to $R_2$ (defined above) and v being the function $[1,2,3]^2 \rightarrow [1,2,3,4,5,6]$ allowing to make the link between the components of a 3×3×3×3 tensor and the components of the same tensor written in a 6×6 matrix form thanks to the exploitation of the two minor and major symmetries, properties which the tensor of the elastic stiffnesses possesses. In other words, the tensor of the stiffnesses C (which had already been expressed in the frame of reference $R_2$), is expressed in the orthogonal local frame of reference $R_1$. This step is illustrated in FIG. 7 by the arrow number 4 which symbolizes the passage from the natural local frame of reference $R_2$ to the orthogonal local frame of reference $R_1$.

This allows to access to the tensor of the stresses $\pi$ in the orthogonal local frame of reference $R_1$ and thus predict the local stress state of the off-centered woven composite material 14, regardless of the value of the off-centering angle $\alpha$. The impact of the off-centering angle $\alpha$ can then be anticipated and the fibres 16a, 16b of the network 18 of the preform 12 can be oriented prior to impregnation with the polymer matrix. The last five steps of the method of the present application are thus:

establishing an optimized configuration of the network 18 of fibres 16a, 16b as a function at least of the stress tensor expressed in the orthogonal local frame of reference $R_1$, before shaping of the preform 12; the orientation of the fibres is optimized everywhere in the digital profile to improve the mechanical response of the final part that will be obtained, locally adapting the fibres 16a, 16b of the network 18 before the impregnation of said network 18 of fibres 16a, 16b by the matrix, so as to fix the fibres 16a, 16b in the optimized configuration before the shaping of the preform 12; this adaptation takes place here during the weaving of the preform by taking into account the optimized configuration of the network upstream, shaping the preform 12 in a mold, after its placing in the mold; alternatively, the placing of the preform is done in the mold, after it has been shaped, impregnating the preform with a polymer matrix (e.g. resin), demolding the part 10 after curing the preform 12 impregnated with polymer matrix.

In this way, the mechanical properties of the part 10 can be predicted at each location and the weaving of the preform 12 can be adapted. This adaptation of the weaving can be done by a local rearrangement of the directions of the and/or a localized modification of the thickness of the fibres 16a, 16b and/or their spacing, for example. This adaptation is then fixed, before the impregnation of the preform by the polymer matrix. This allows the expected properties of the woven composite material 14 to be maintained despite the shaping, and allows the dimensional margins associated with the uncertainty of the mechanical properties of the woven composite material 14 after shaping the preform 12 to be avoided. In other words, the loom is reparametrized to produce a fibrous preform whose orientation of the weft and warp fibres allow to anticipate the behavior of the woven composite material with off-centering angles.

Figure 8:
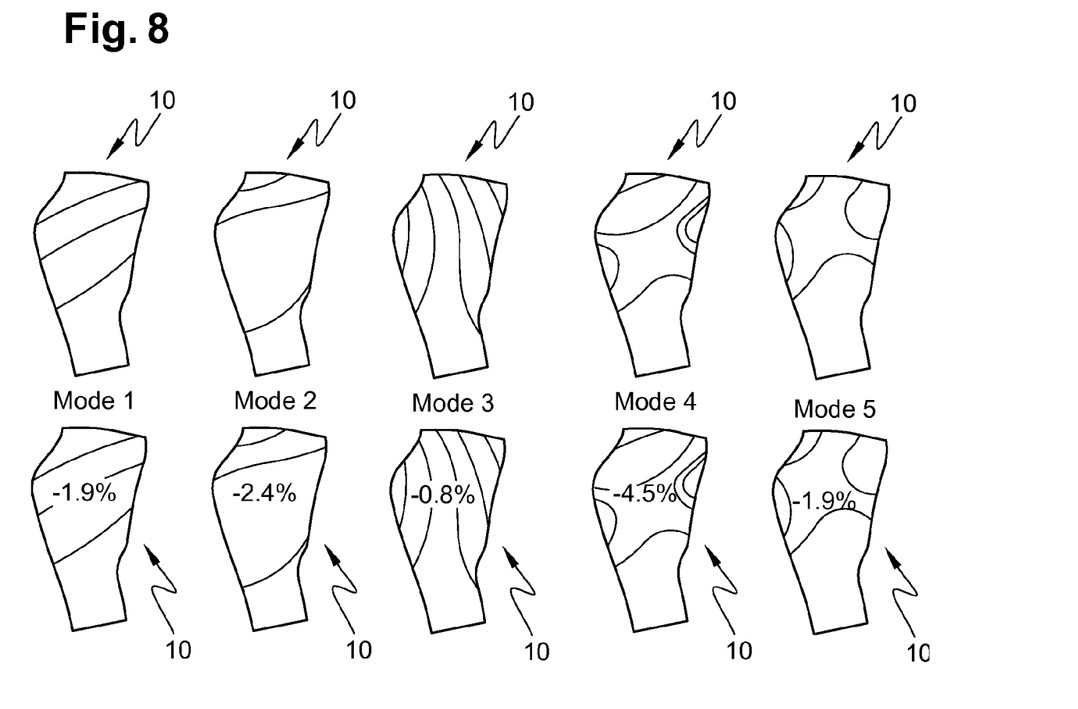
FIG. 8 is a series of schematically drawn turbomachine vanes produced by means of the method according to the present invention.

It can be seen in FIG. 8 that when the off-centering angle $\alpha$ is changed along the surface of the part 10, a difference is observed on the modal response of said part 10 (here a fan vane). For example, the modal response is determined by subjecting the part to waves (e.g. sound): the vibrations of the part, in response to these waves, are measured via sensors and/or cameras. Depending on the percentage of off-centering, the vibratory propagations are different in the part as shown by the lines in the vanes drawn in FIG. 8. The vibratory response is differently compliant to different modes and the part can thus be characterized in predictions of its behavior in particular under aeroelastic loads.

The technical solution presented here has very practical advantages. It can be applied to any type of general behavior law L and its implementation is simple and fast. The use of the method is immediate and requires no identification, with the off-centering angle α being the only additional input data required. Moreover, this approach has no impact on the calculation time, the transformations on the tensors of the deformations and the stresses 3×3 being almost instantaneous.

The invention claimed is:

1. A method for producing a part made of a composite material from a woven preform intended to be shaped, the method comprising:
   weaving the woven preform, wherein the woven preform is weaved by locally adapting woven warp fibers and woven weft fibers forming a network prior to shaping the woven preform into the intended shape, wherein the network prior to shaping the woven preform into the intended shape has two preferred directions that are substantially perpendicular to each other, and wherein the network prior to shaping the woven preform follows a known general behavior law (L),
   testing only woven composite material with zero off-centering angle α to determine one tensor of stiffnesses (C) without shaping of the woven perform, said tensor of stiffnesses (C) being expressed in an orthogonal local frame of reference ($R_1$) defined with respect to the network before the shaping of the woven preform;
   modeling the shape of the woven preform of the part to be produced with a computer programmed to carry out a computer-aided finite-elements routine, wherein said modeling the shape of the part comprises:
      defining a natural local frame of reference ($R_2$) with respect to the network after the shaping of the woven preform;
      defining a linked frame of reference ($R^2$) with respect to the network;
      constructing a deformation tensor of deformations (E) in the orthogonal local frame of reference ($R_1$);
      expressing, in the linked frame of reference ($R^2$), the deformation tensor of deformations (E) previously constructed in the orthogonal local frame of reference ($R_1$);
      calculating a stress tensor of stresses ($\pi$) in the natural local frame of reference ($R_2$) from the behavior law (L) that is dependent on a tensor of stiffnesses expressed in the natural local frame of reference ($R_2$) and the deformation tensor expressed in the linked frame of reference (R2), by using, as the tensor of the stiffnesses expressed in the natural local frame of reference ($R_2$), the tensor of the stiffnesses (C) of the woven composite material without shaping of the woven preform, expressed in the orthogonal local frame of reference ($R_1$), which is unchanged regardless of the off-centering angle; and
      establishing an optimized configuration for the network based upon at least the stress tensor expressed in the orthogonal local frame of reference ($R_1$) before the shaping of the woven preform;
   the method further comprising
   shaping the woven preform according to the modelled shape;
   placing the shaped woven preform in a mold; thereafter impregnating the shaped woven preform placed in the mold with a polymer matrix for obtaining the part; and
   demolding the part.

2. The method according to claim 1, wherein the natural local frame of reference ($R_2$) is attached to the preferred directions of the fibers of the off-centered network, the natural local frame of reference ($R_2$) being non-orthogonal in the presence of the off-centering angle α, wherein the off-centering angle α is non-zero.

3. The method according to claim 1, wherein the natural local frame of reference ($R_2$) is a covariant local frame of reference and wherein the linked frame of reference ($R^2$) is the contravariant local frame of reference, dual of the natural local frame of reference ($R_2$).

4. The method according to claim 1, wherein a passage from the orthogonal local frame of reference ($R_1$) to the natural local frame of reference ($R_2$) is made by means of a passage matrix ($J^T$) defined as:

$$J^T = \begin{pmatrix} 1 & \sin\alpha & 0 \\ 0 & \cos\alpha & 0 \\ 0 & 0 & 1 \end{pmatrix}$$

5. The method according to claim 1, wherein the part is a vane.

6. The method according to claim 1, wherein the part is a casing.

7. The method according to claim 1, further comprising:
   expressing, in the orthogonal local frame of reference ($R_1$), the tensor of the stresses ($\pi$) calculated beforehand using the behavior law (L);
   expressing the tensor of the stiffness C, already expressed in the natural local frame of reference ($R_2$), in the orthogonal local frame of reference ($R_1$); and
   numerically solving using the finite-element routine by a tangent operator comprising components determined from those of the tensor of the stiffness previously expressed in the orthogonal local frame of reference ($R_1$).

8. The method according to claim 7, wherein the components of the tangent operator are equal to those of the tensor of the stiffness previously expressed in the orthogonal local frame of reference ($R_1$).

9. The method according to claim 7, wherein the behavior law L is a linear elastic behavior law and wherein the tangent operator is a tensor of the elastic stiffnesses.

* * * * *